April 13, 1965   R. A. ANDERSSON   3,177,702
TESTING DEVICE
Filed Aug. 20, 1962   3 Sheets-Sheet 1

Rune A. Andersson
INVENTOR.

BY *Clarence A. O'Brien*
*and Harvey B. Jacobson*
Attorneys

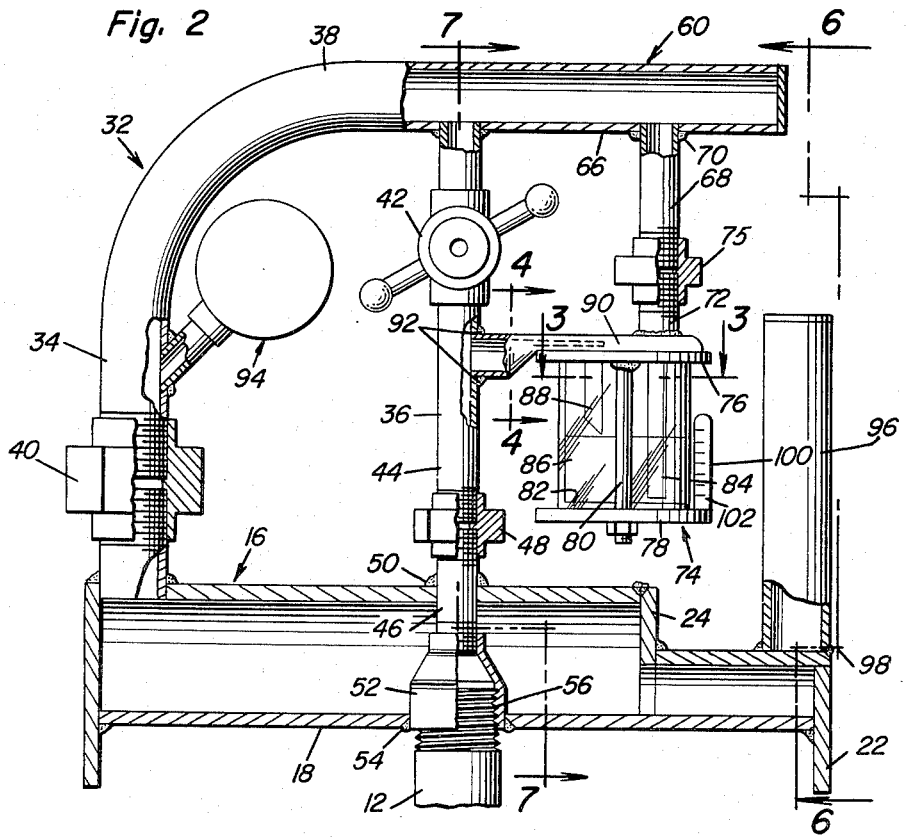

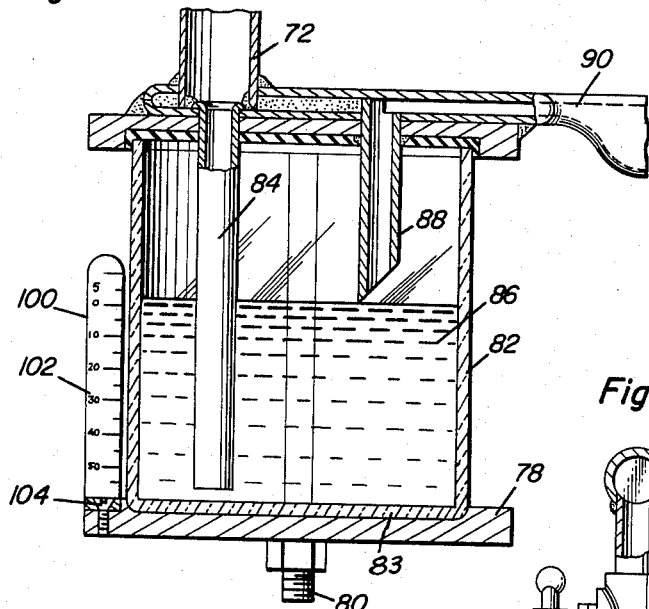
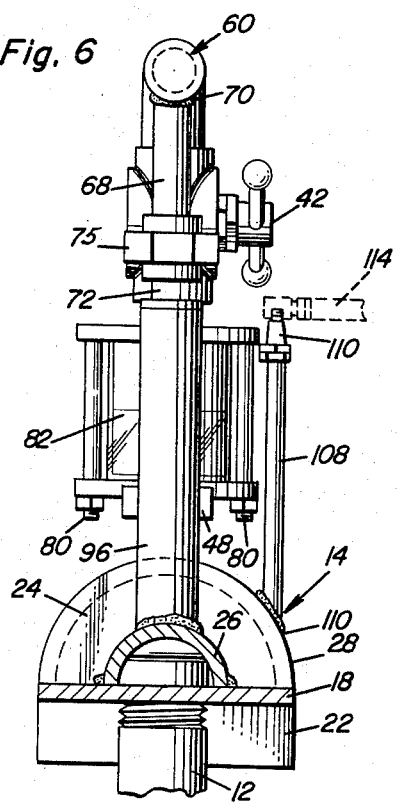
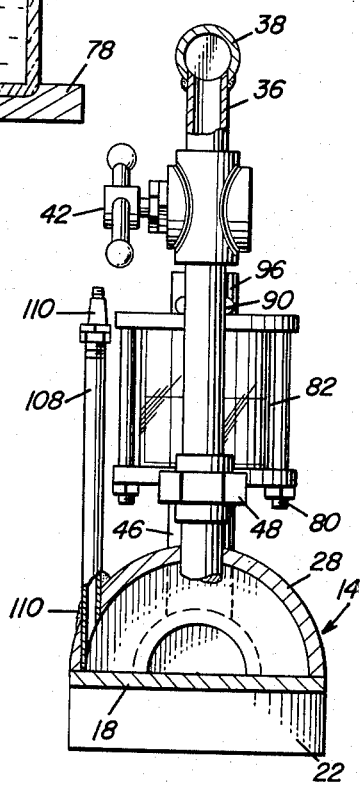
Fig. 5
Fig. 6
Fig. 7
Rune A. Andersson
INVENTOR.

3,177,702
TESTING DEVICE
Rune A. Andersson, 324 Percy St., Brandon,
Manitoba, Canada
Filed Aug. 20, 1962, Ser. No. 217,824
10 Claims. (Cl. 73—40)

This invention relates to a novel and useful testing device and more particularly to an apparatus designed primarily for testing a vessel for leaks by pressurizing that vessel and applying highly sensitive gauge means for accurately determining the presence of any small leaks.

The testing device of the instant invention comprises a tank which is provided with an outlet conduit having one end communicated with the interior of the tank and means on the other end adapted to be secured to a coupling member communicated with the interior of the vessel which is to be tested. A by-pass line has its opposite ends communicated with the outlet line of the tank at points spaced longitudinally along the outlet line and a control valve is disposed in the conduit intermediate the poins at which the by-pass lines are communicated with the conduit. Liquid trap means is disposed in the by-pass line and if both the vessel which is to be tested and the tank have the same amount of gas pressure therein and the control valve is closed, the air tank and vessel being tested are in communication with each other solely by means of the liquid trap whereupon any reduction in pressure within the vessel being tested will result in a flow of air from the tank into the vessel being tested in order to equalize the pressure, which flow of air through the liquid trap may be readily detected by the presence of air bubbling through the liquid in the liquid trap.

The main object of this invention is to provide a testing device for detecting leaks in vessels of any configuration.

A further object of this invention, in accordance with the immediately preceding object, is to provide a testing device which is readily adapted to be utilized in introducing either small or large quantities of air under pressure into the vessel which is to be tested.

Still another object of this invention is to provide a device which will be capable of detecting the smallest of leaks in the vessel being tested.

A still further object of this invention is to provide a testing device which is specifically designed to be handled in cramped quarters and which is constructed in a manner whereby its attachment to a vessel in sealed relation therewith may be accomplished without the use of any tools.

Still another object of this invention is to provide a testing device in accordance with the preceding objects which may be utilized to test a vehicle for leaks regardless of whether the pressure within the vessel to be tested is normally above or below atmospheric pressure.

A final object of this invention to be specifically enumerated herein is to provide a testing device in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is an enlarged longitudinal vertical sectional view taken substantially upon the plane indicated by section line 2—2 of FIGURE 1;

FIGURE 3 is an enlarged horizontal sectional view taken substantially upon the plane indicated by the section line 3—3 of FIGURE 2;

FIGURE 4 is an enlarged fragmentary transverse vertical sectional view taken substantially upon the plane indicated by section line 4—4 of FIGURE 2;

FIGURE 5 is a fragmentary enlarged longitudinal vertical sectional view taken substantially upon the plane indicated by section line 5—5 of FIGURE 3;

FIGURE 6 is a transverse vertical sectional view taken substantially upon the plane indicated by section line 6—6 of FIGURE 2;

FIGURE 7 is a transverse vertical sectional view taken substantially upon the plane indicated by section line 7—7 of FIGURE 2.

Figure 1:
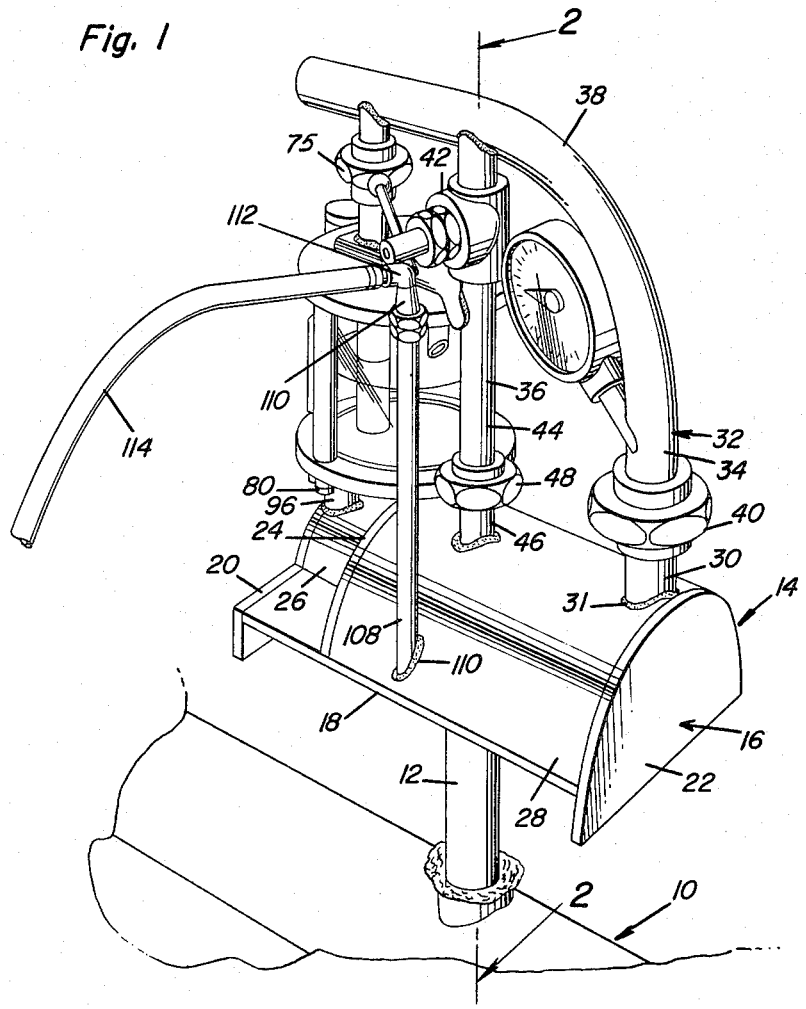
FIGURE 1 is a perspective view of the testing device of the instant invention shown operatively associated with a section of pipe which is to be tested for leaks.
Figure 8:
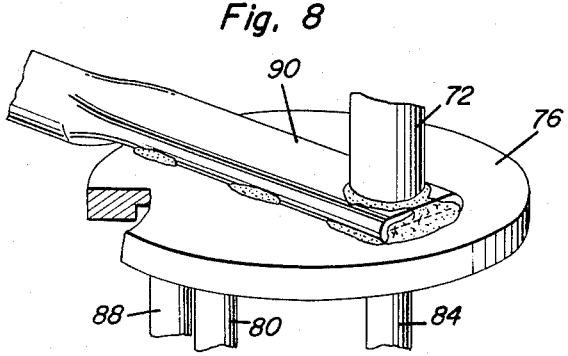
FIGURE 8 is an enlarged fragmentary perspective view of a portion of the testing device illustrating the mannei in which the liquid trap is disposed in the by-pass line of the testing device.

Referring now more specifically to the drawings there will be seen a liquid pipe or the like generally referred to by the reference numeral 10 which has one end of a coupling member 12 secured thereto in communication with the interior of the pipe 10. The testing device of the instant invention is generally referred to by the reference numeral 14 and includes an elongated tank generally referred to by the reference numeral 16 including a bottom wall 18 opposite end walls 20 and 22, an intermediate end wall 24 and a pair of longitudinally spaced top walls 26 and 28.

An outlet neck 30 is secured to the top wall 28 in any convenient manner such as by welding 31 and is in communication with the interior of the tank 16. An outlet line is provided and is generally designated by the reference numeral 32. The outlet line 32 is generally U-shaped in configuration and includes a pair of legs 34 and 36 which are interconnected by means of a bight portion 38. The free end of the leg 34 is secured to the outer end of the outlet neck 30 by means of a coupling 40 and it will be noted that the leg 36 has a control valve 42 disposed therein. In addition, it may be seen that the leg 36 comprises an upper section 44 and a lower section 46 and that the lower end of the upper section 44 is secured to the upper end of the lower section by means of a coupling 48.

As can best be seen from FIGURE 2 of the drawings, the lower section 46 projects through and is secured to the upper top wall 28 by means of welding 50. The lower section 46 has a reducing coupling 52 threadedly engaged therewith and the lower end of the reducing coupling projects and is secured through the bottom wall 18 in any convenient manner such as by welding 54 and is internally threaded as at 56 and threadedly engaged with the upper end of the coupling member 12.

A by-pass line generally referred to by reference numeral 60 is provided and includes a first leg 66 forming a continuation of the bight portion 38 generally paralleling the longitudinal axis of the tank 16. A second leg 68 is secured to the free end of the first leg 66 in any convenient manner such as by welding 70 and is operatively connected to an inlet neck 72 of a liquid trap generally referred to by the reference numeral 74 by means of a coupling 75. The water trap 74 includes top and bottom plates 76 and 78 which are secured together by means of suitable tension members 80 and have a transparent cylindrical body 82 disposed therebetween having a bottom wall 83. The inlet neck 72 opens downwardly through the top plate 76 and terminates at its lower end in a reduced diameter inlet line 84 which terminates at a point spaced closely adjacent the bottom wall 83. A quantity of liquid 86 is disposed within the body 82 and the lower end of an outlet line 88 which is carried by the top plate 76 terminates a spaced distance above the level of the liquid 86. The outlet line 88 projects upwardly through the top plate 76 and is communicated with a third leg 90 of the by-pass line 60. The third leg 90 generally parallels the first leg 66 and has its end remote from the outlet line 88 communicated with and secured to the leg 36 by any suitable manner such as by means of welding 92. It will be noted that the control valve 42 is disposed in the leg 36 intermediate the points at which the opposite ends of the by-pass line 60 are communicated with the outlet line 32.

A pressure gauge generally referred to by the reference numeral 94 is communicated with the leg 34 of the outlet line 32 and a tubular handle 96 is secured at one end to the end of the tank 16 remote from the outlet neck 30 in any convenient manner such as by welding 98. The tubular handle 96 generally parallels the leg 34 and a gauge member 100 having indicia 102 thereon is secured to the bottom plate 78 by means of a suitable fastener 104 for the purpose of determining any change in the liquid level within the body 82.

It will be noted that the inlet and outlet lines 84 and 88 are of considerably smaller diameter than the outlet line 32 and that the end of the leg 90 of the by-pass line 60 adjacent the outlet line 88 is restricted in cross section.

With attention again invited to FIGURE 1 of the drawings, it may be seen that an air inlet line 108 has one end secured through the top wall 28 in any convenient manner such as by welding 110 and that the upper end of the inlet line 108 includes a valved inlet nozzle 110 which may be similar to that utilized in the construction of pneumatic tire inner tubes. Accordingly, it may be seen that the outlet nozzle 112 of a conventional air line 114 may be readily engaged with the inlet line 108 to pressurize the tank 16.

In operation, when it is desired to test the pipe 10 for leaks, the opposite ends of the pipe 10 may be closed and the reducing coupling 52 may be engaged with the upper end of the coupling member 12. Then, air under pressure may be admitted into the tank 16 by means of the inlet line 108 either by means of a small hand pump or by means of an air line such as air line 114. After the desired pressure within the pipe 10 and the tank 16 has been achieved, assuming that the control valve 42 is in the open position, and as will be indicated by the pressure gauge 94, the air line 114 is removed from engagement with the inlet line 108 and the control valve 42 is closed. Then, any reduction of pressure within the pipe 10 will cause a flow of air under pressure from the tank 16 into the pipe 10 through the liquid trap 74 in order to equalize the pressure within the tank 16 and the pipe 10. Any movement of air through the liquid trap 74 may be readily ascertained. On the other hand, should there be a leak in the tank 16, air from within the pipe 10 will move through the trap 74 and will cause the liquid 86 within the trap 74 to pass upwardly through the inlet line 84. This will of course cause a drop in the liquid level of the liquid 86 which may be readily ascertained by means of the gauge 100. If it is desired, the lower end of the line 88 may also extend down into the liquid 86 in order that the presence of air bubbles will readily disclose the passage of air through the trap 74 in both directions.

It will be noted that the testing device 14 may be readily threadedly engaged with the upper end of the coupling member 12 inasmuch as both the tubular handle 96 and the leg 34 of the outlet line 32 may be utilized as handles in order to effect rotation of the tank 16 about an axis defined by the longitudinal center axis of the leg 36. Accordingly, it may be seen that the testing device 14 may be secured in any operative position for testing the water pipe 10 without the use of tools.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A testing device for testing a pressurized vessel having a coupling member communicated with the interior thereof, said testing device comprising a tank, an outlet conduit having one end communicated with the interior of said tank and means on the other end adapted to be secured to said coupling member, a by-pass line having its opposite ends communicated with said outlet line at points spaced longitudinally therealong, a control valve disposed in said conduit intermediate said points and liquid trap means disposed in said by-pass line, said outlet line being generally U-shaped and includes a pair of legs disposed at generally right angles to the longitudinal axis of said tank interconnected at corresponding ends by means of a bight portion generally paralleling said longitudinal axis, the free end of one of said legs secured to and communicated with one end of said tank and the free end of the other of said legs being secured to said tank at a point spaced generally equally from the opposite ends of said tank, and an elongated handle secured to and extending laterally away from said other end of said tank and generally paralleling said one leg.

2. The combination of claim 1 wherein the free end of said other leg is threaded for threaded engagment with said coupling member.

3. The combination of claim 1 including a pressure gauge communicated with the interior of said tank at a point upstream of said liquid trap and control valve and disposed within the area bound by said generally U-shaped outlet line and said tank.

4. The combination of claim 3 including an inlet line having one end communicated with the interior of said tank at a point upstream of said liquid trap and control valve.

5. The combination of claim 4 wherein said inlet line has a check valve disposed therein preventing reverse flow of fluid through said inlet line.

6. A testing device for testing a pressurized vessel having a coupling member communicated with the interior thereof, said testing device comprising a tank, an outlet conduit having one end communicated with the interior of said tank and means on the other end adapted to be secured to said coupling member, a by-pass line having its opposite ends communicated with said outlet line at points spaced longitudinally therealong, a control valve disposed in said conduit intermediate said points and liquid trap means disposed in said by-pass line, said outlet line being generally U-shaped and includes a pair of legs disposed at generally right angles to the longitudinal axis of said tank interconnected at corresponding ends by means of a bight portion generally paralleling said longitudinal axis, the free end of one of said legs secured to and communicated with one end of said tank and the free end of the other of said legs being secured to said tank at a point spaced generally equally from the opposite ends of said tank, and an elongated handle secured to and extending laterally away from said other end of said tank and generally paralleling said one leg, said free end of said other leg passing through and secured to said tank in fluid tight sealing engagement therewith.

7. The combination of claim 6 wherein said one leg, said handle and said other leg all lie in substantially the same plane.

8. A testing device for testing a pressurized vessel having a coupling member communicated with the interior thereof, said testing device comprising a tank, an outlet conduit having one end communicated with the interior of said tank and means on the other end adapted to be secured to said coupling member, a by-pass line having its opposite ends communicated with said outlet line at points spaced longitudinally therealong, a control valve disposed in said conduit intermediate said points and liquid trap means disposed in said by-pass line, said outlet line being generally U-shaped and includes a pair of legs disposed at generally right angles to the longitudinal axis of said tank interconnected at corresponding ends by means of a bight portion generally paralleling said longitudinal axis, the free end of one of said legs secured to and communicated with one end of said tank and the free end of the other of said legs being secured to said tank at a point spaced generally equally from the opposite ends of said tank, and an elongated handle secured to and extending laterally away from said other end of said tank and generally paralleling said one leg, a pressure gauge communicated with the interior of said tank at a point upstream of said liquid trap and control valve, an inlet line having one end communicating with the interior of said tank at a point upstream of said liquid trap and control valve, said inlet line having a check valve disposed therein preventing reverse flow of fluid through said inlet line.

9. The combination of claim 8 wherein the free end of said other leg passes through and is secured to said tank in fluid tight sealing engagement therewith.

10. A testing device for testing a pressurized vessel having a coupling member communicated with the interior thereof, said testing device comprising a tank, an outlet conduit having one end communicated with the interior of said tank and means on the other end adapted to be secured to said coupling member, a by-pass line having its opposite ends communicated with said outlet line at points spaced longitudinally therealong, a control valve disposed in said conduit intermediate said points and liquid trap means disposed in said by-pass line, said outlet line including a pair of opposite end portions projecting laterally outwardly to one side of said tank at points spaced therealong and an intermediate portion interconnecting the outer ends of said end portions, the free end of one of said end portions being secured to and communicated with the interior of one end of said tank and the free end of the other end portion being secured to said tank, an elongated handle secured to and extending laterally outwardly of said one side of said tank and disposed on the side of said other end portion remote from said one end portion.

References Cited by the Examiner
UNITED STATES PATENTS
2,796,757   6/57   Peterson _____ 73—40

ISAAC LISANN, *Primary Examiner.*